United States Patent [19]
van der Lely

[11] 3,957,122
[45] May 18, 1976

[54] ROTARY PLOUGHS

[76] Inventor: Cornelis van der Lely, 7, Bruschenrain, Zug, Switzerland

[22] Filed: Mar. 4, 1974

[21] Appl. No.: 447,940

[30] Foreign Application Priority Data
Mar. 6, 1973  Netherlands.................... 7303080

[52] U.S. Cl.............................. 172/60; 172/92; 172/121; 172/123; 172/554
[51] Int. Cl.².............................. A01B 33/00
[58] Field of Search ............... 172/97, 92, 91, 125, 172/60, 118, 119, 121, 123, 545, 546, 39

[56] References Cited
UNITED STATES PATENTS

| | | | |
|---|---|---|---|
| 1,006,844 | 10/1911 | Glassburn et al.............. | 172/119 X |
| 1,552,362 | 9/1925 | Versteeg........................ | 172/121 X |
| 1,574,840 | 3/1926 | Murphree....................... | 172/554 X |
| 2,514,395 | 7/1950 | Iseman........................... | 172/121 X |
| 2,845,015 | 7/1958 | Carawan........................ | 172/121 X |
| 3,297,095 | 1/1967 | van der Lely................... | 172/60 X |

FOREIGN PATENTS OR APPLICATIONS
6,500,652  7/1965  Netherlands...................... 172/123

*Primary Examiner*—Stephen C. Pellegrino
*Attorney, Agent, or Firm*—Mason, Mason & Albright

[57] ABSTRACT

A rotary plough has one or more rotors rotatably mounted to be driven via a power take off about a horizontal axis that extends transverse to the direction of travel. Each rotor has a central support and axis of rotation and two spaced apart and oppositely positioned rotatable soil working members, each of which has a soil working support with two rows of tines. A driving connection is established between a P. T. O. and a shaft within the central support which turns each soil working member through a control mechanism. The control mechanism can be a pinion gear arrangement or a chain and sproket combination that turns the tine supports of the soil working members so that a transmission ratio is established to cause the tines to rotate more or less about their supports while also turning about the central support. Earth lumps are cut and lifted by the tines and then moved to an inverted position back to the dug out cavity. An adjusting lever is attached to turn the shaft relative to the central support which also varies the relative positions of the rows of tines and changes their angle of soil penetration. Two rotors can be provided each with two soil working members and the four members can be spaced 90° apart around the central support.

40 Claims, 24 Drawing Figures

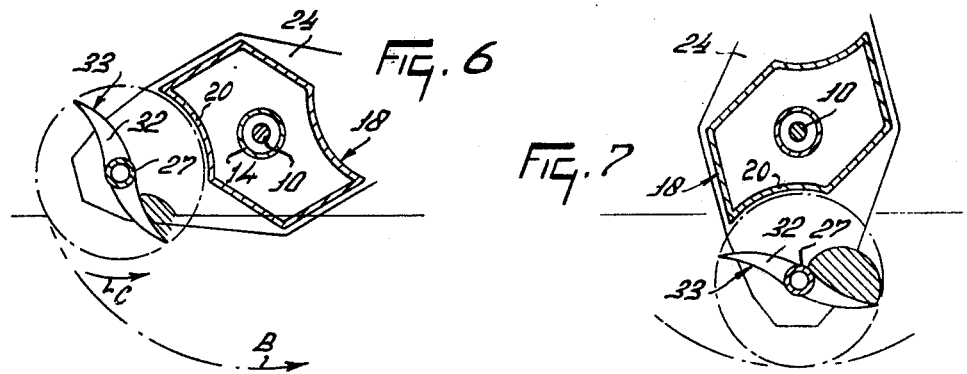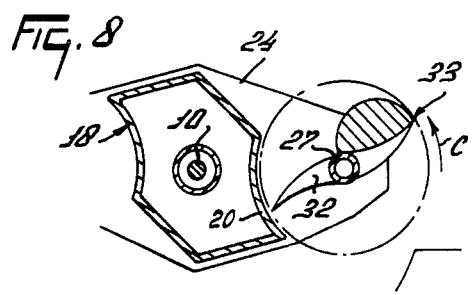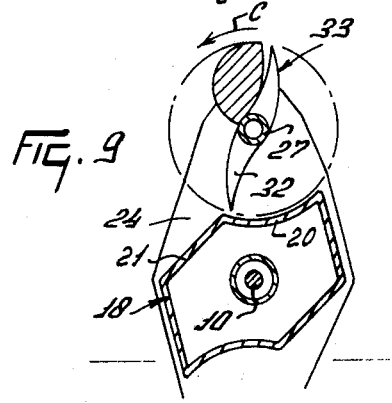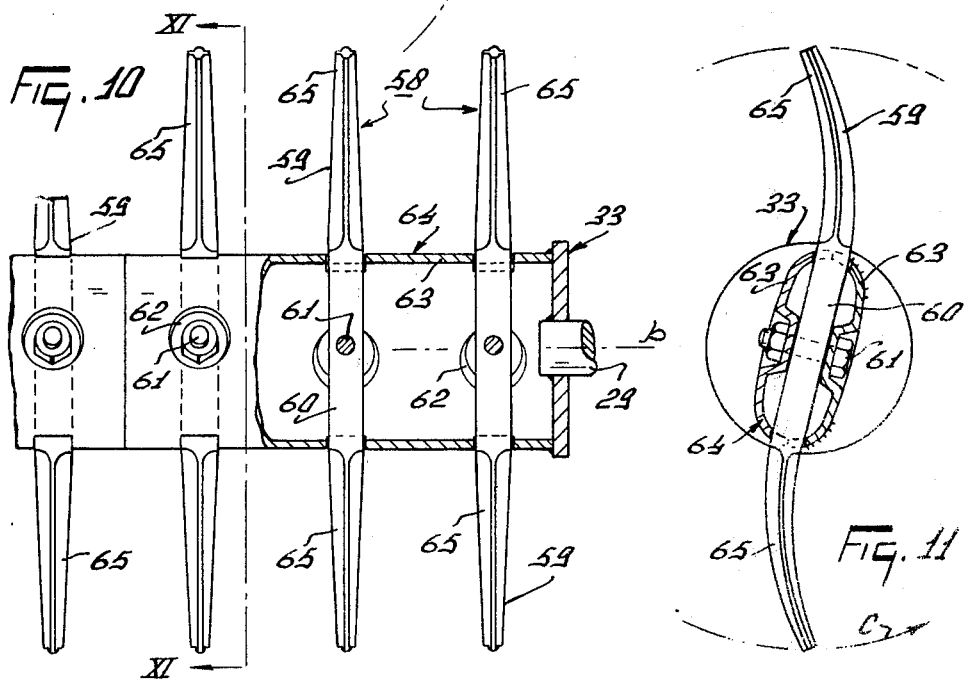

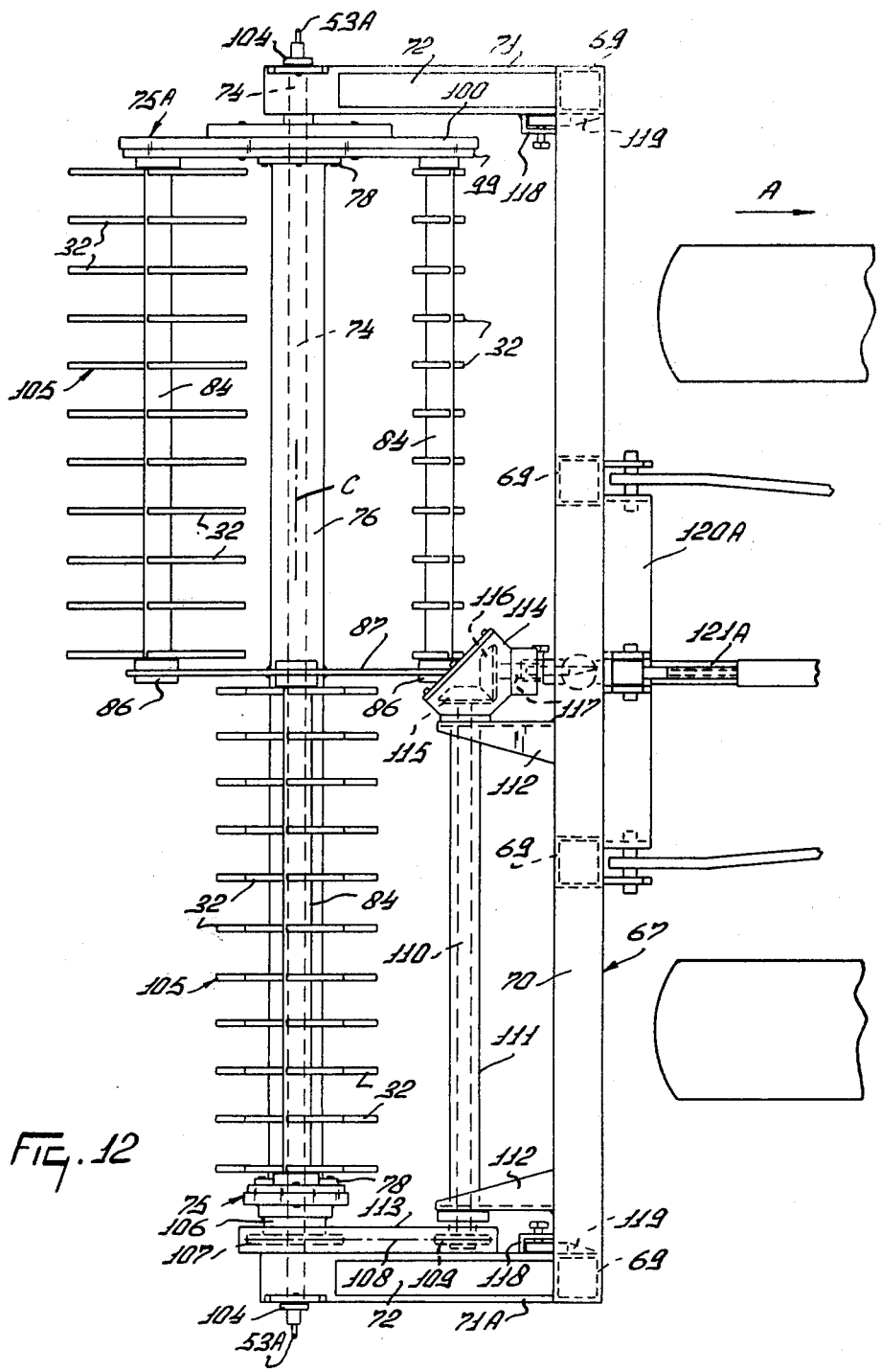

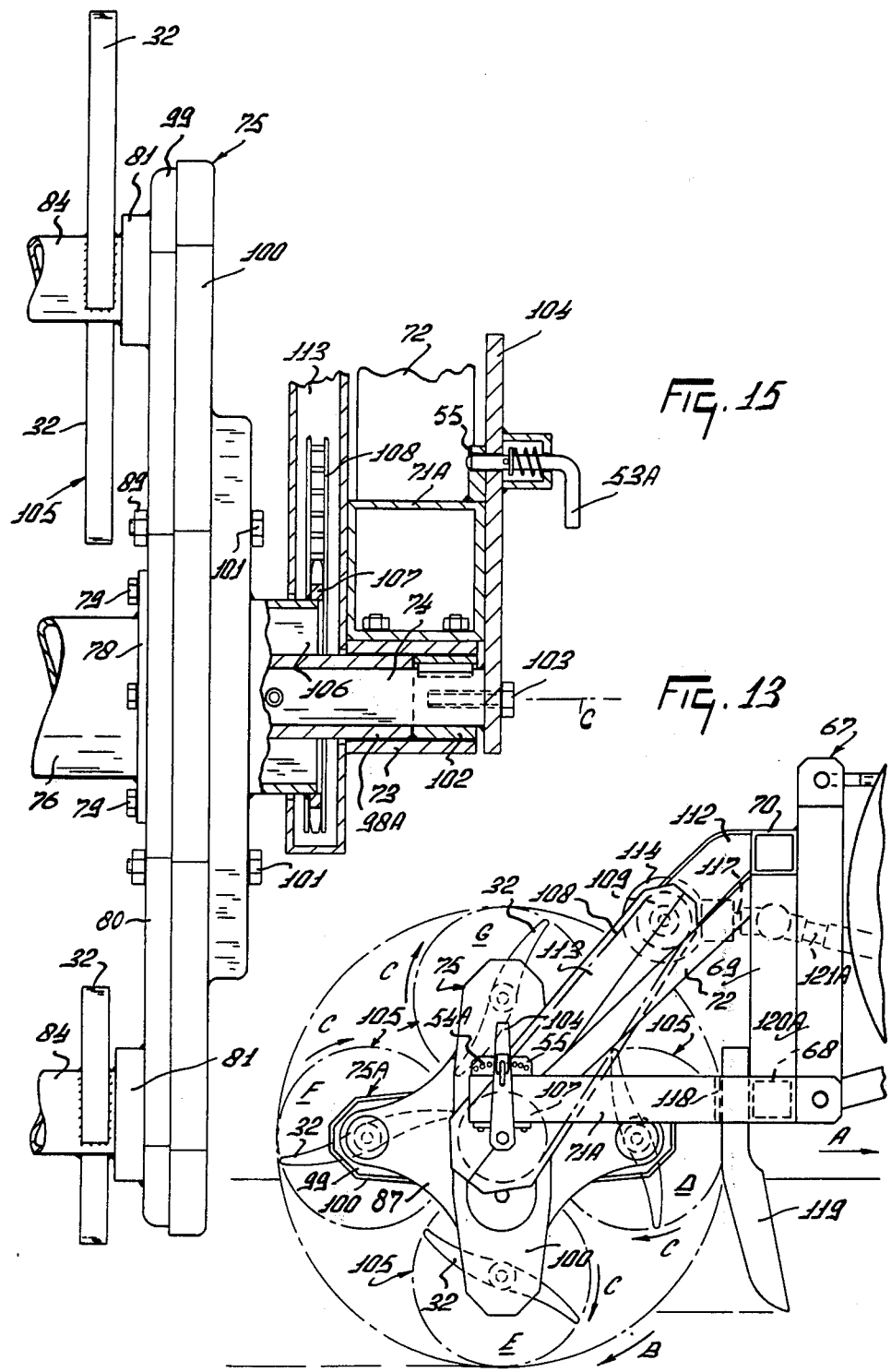

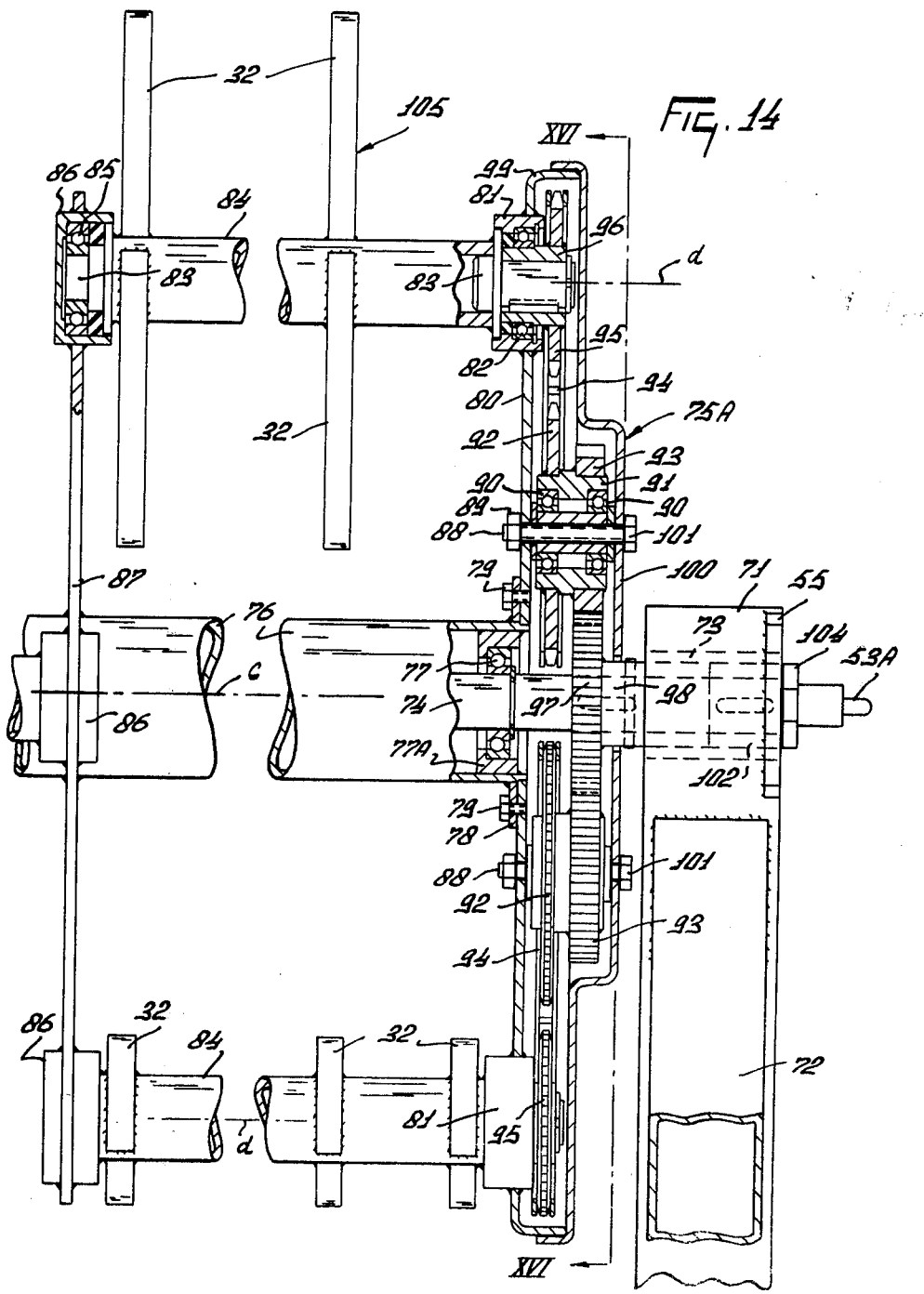

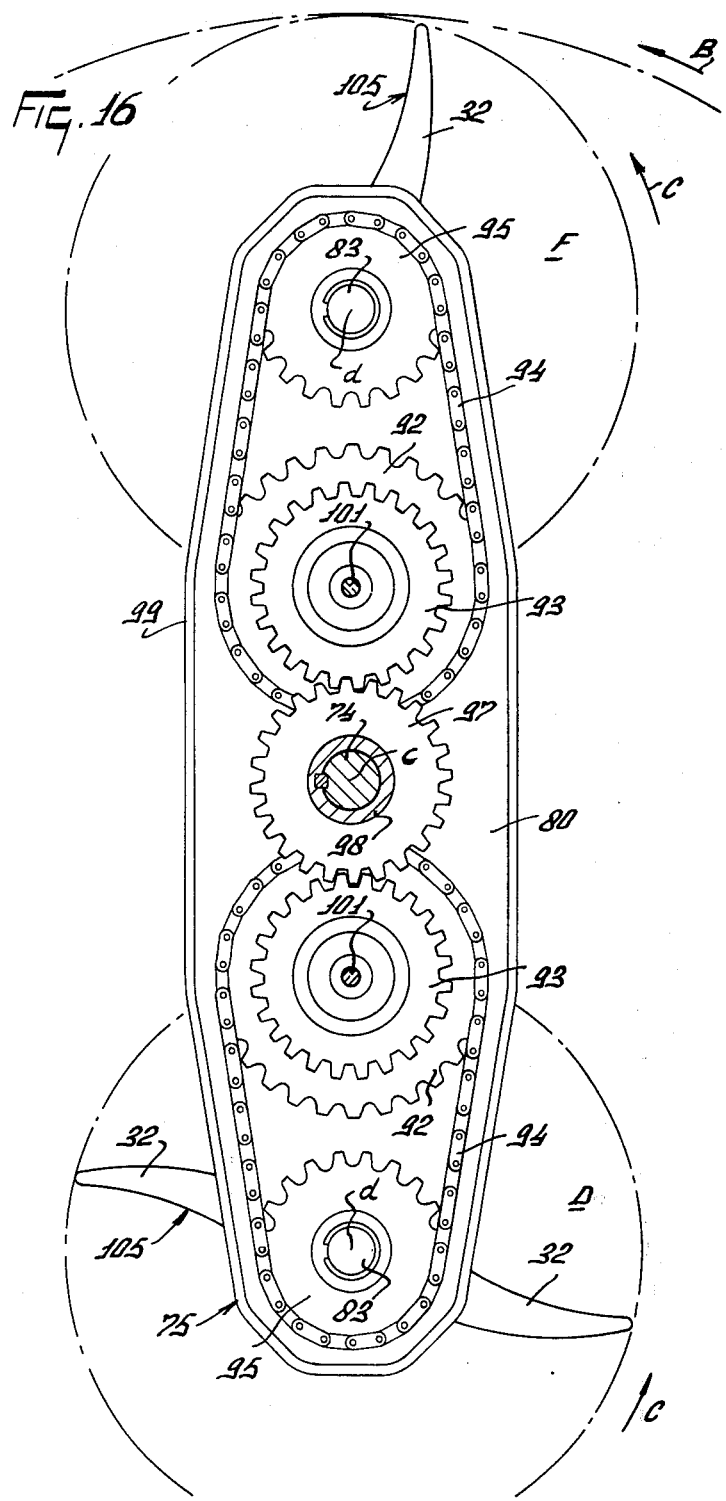

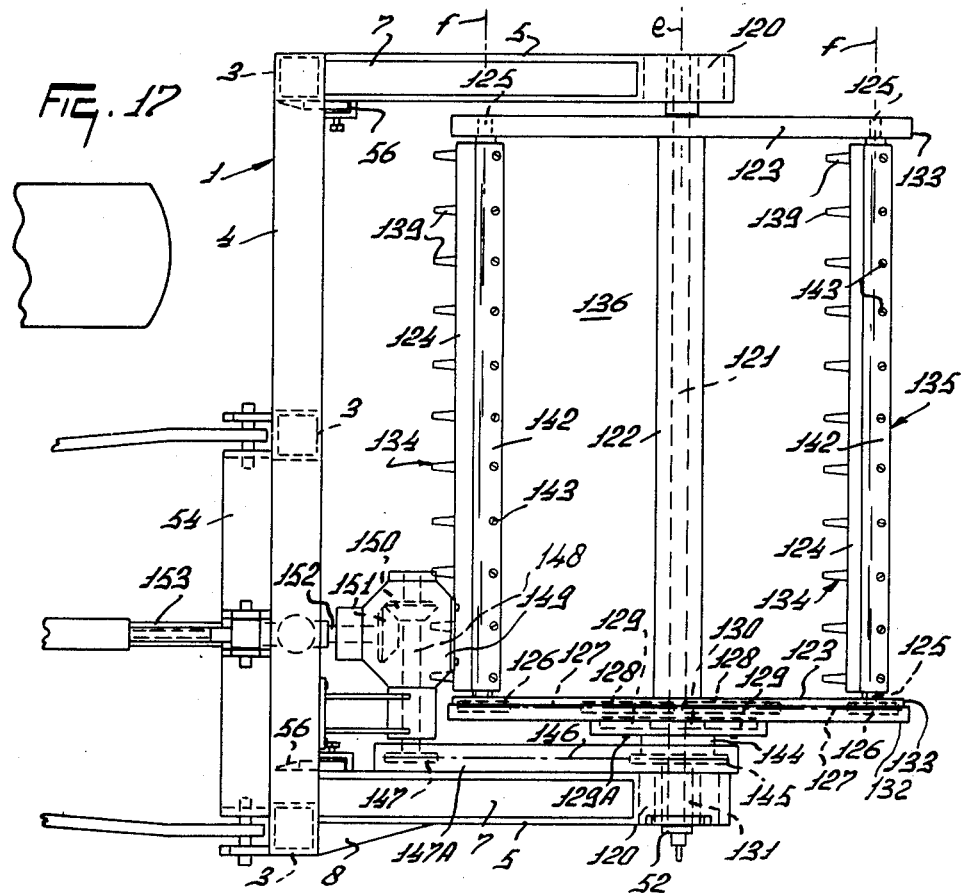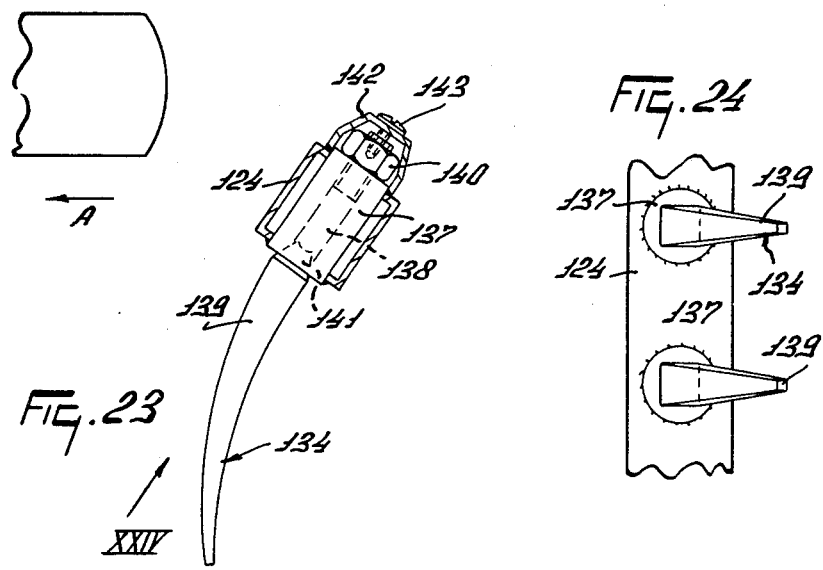

ROTARY PLOUGHS

This application is related to Ser. No. 417,366 filed Nov. 19, 1973.

For a better understanding of the invention, and to show how the same may be carried into effect, reference will now be made, by way of example, to the accompanying drawings, in which:-

Figure 1:
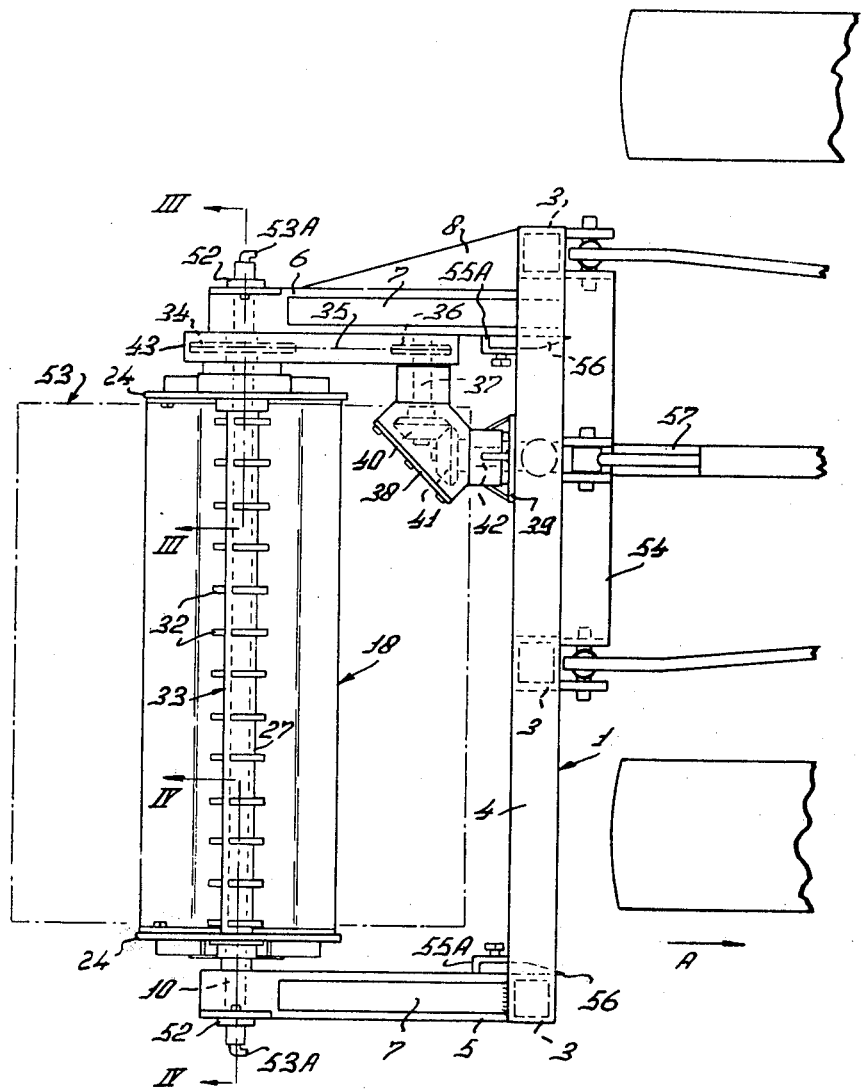
Figure 2:
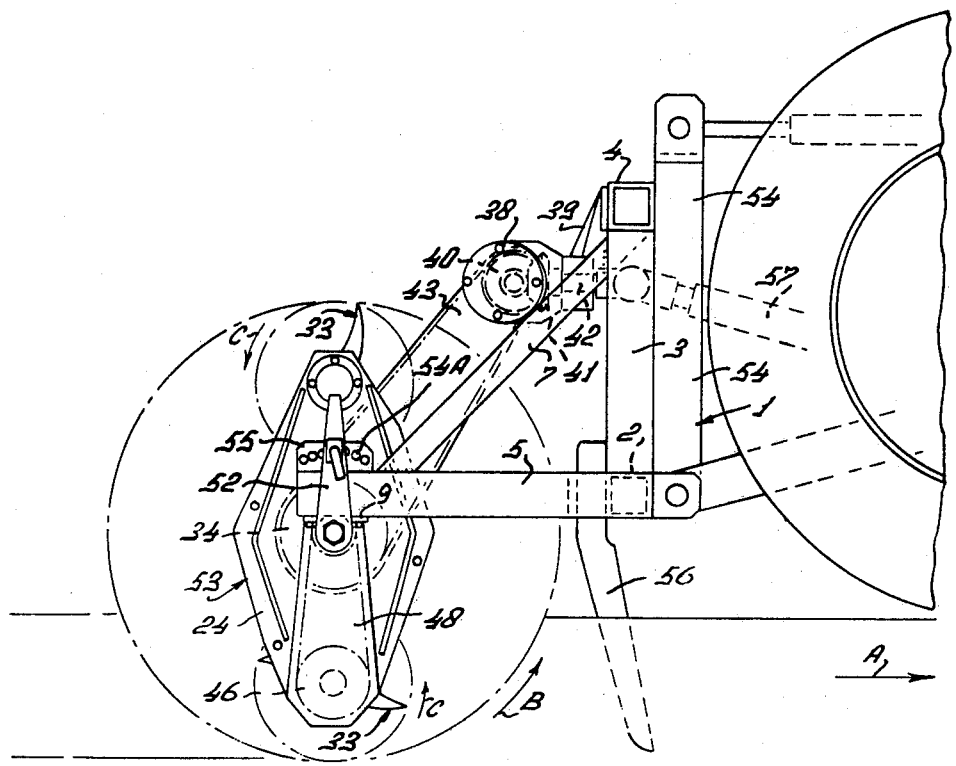
Figure 3:
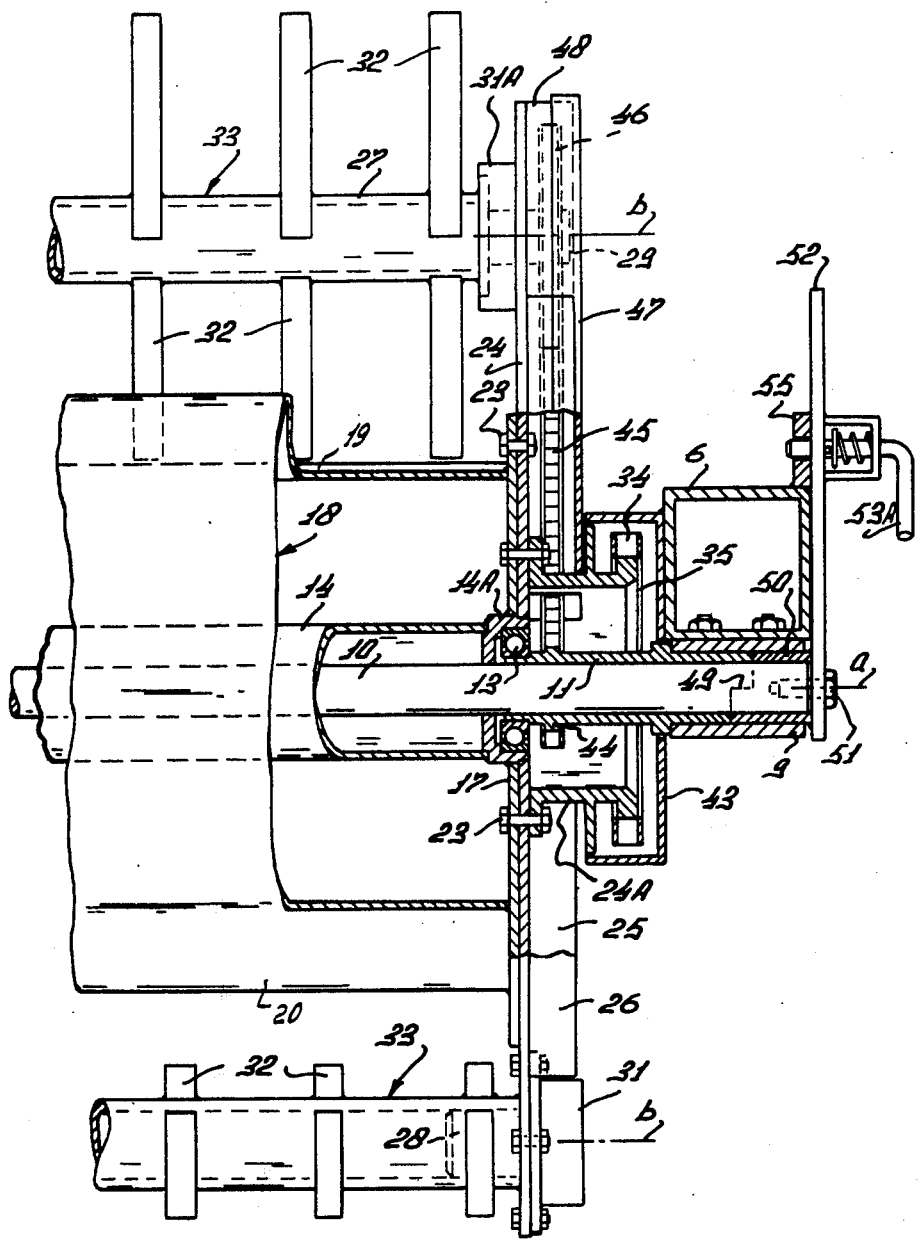
Figure 4:
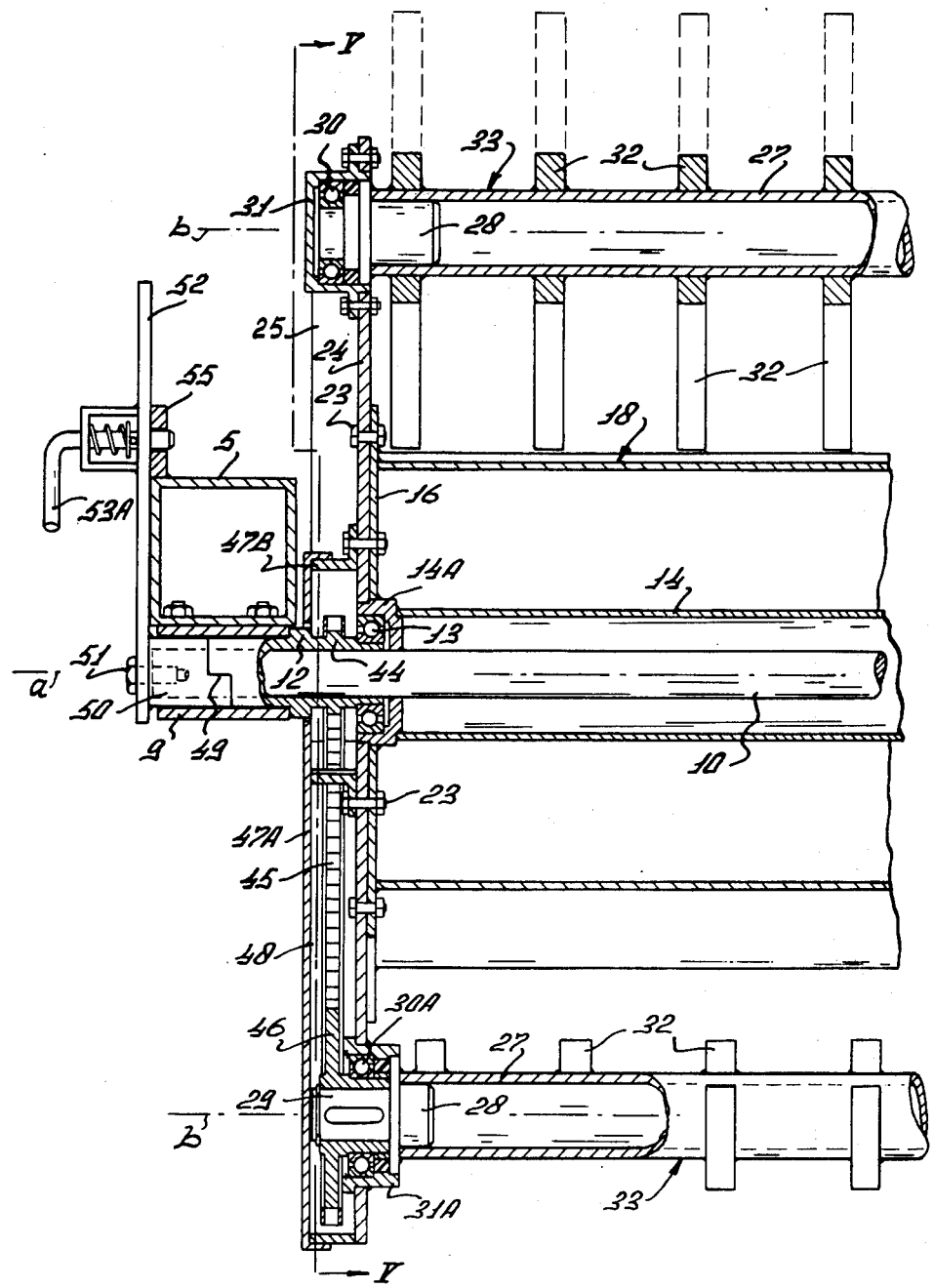
Figure 5:
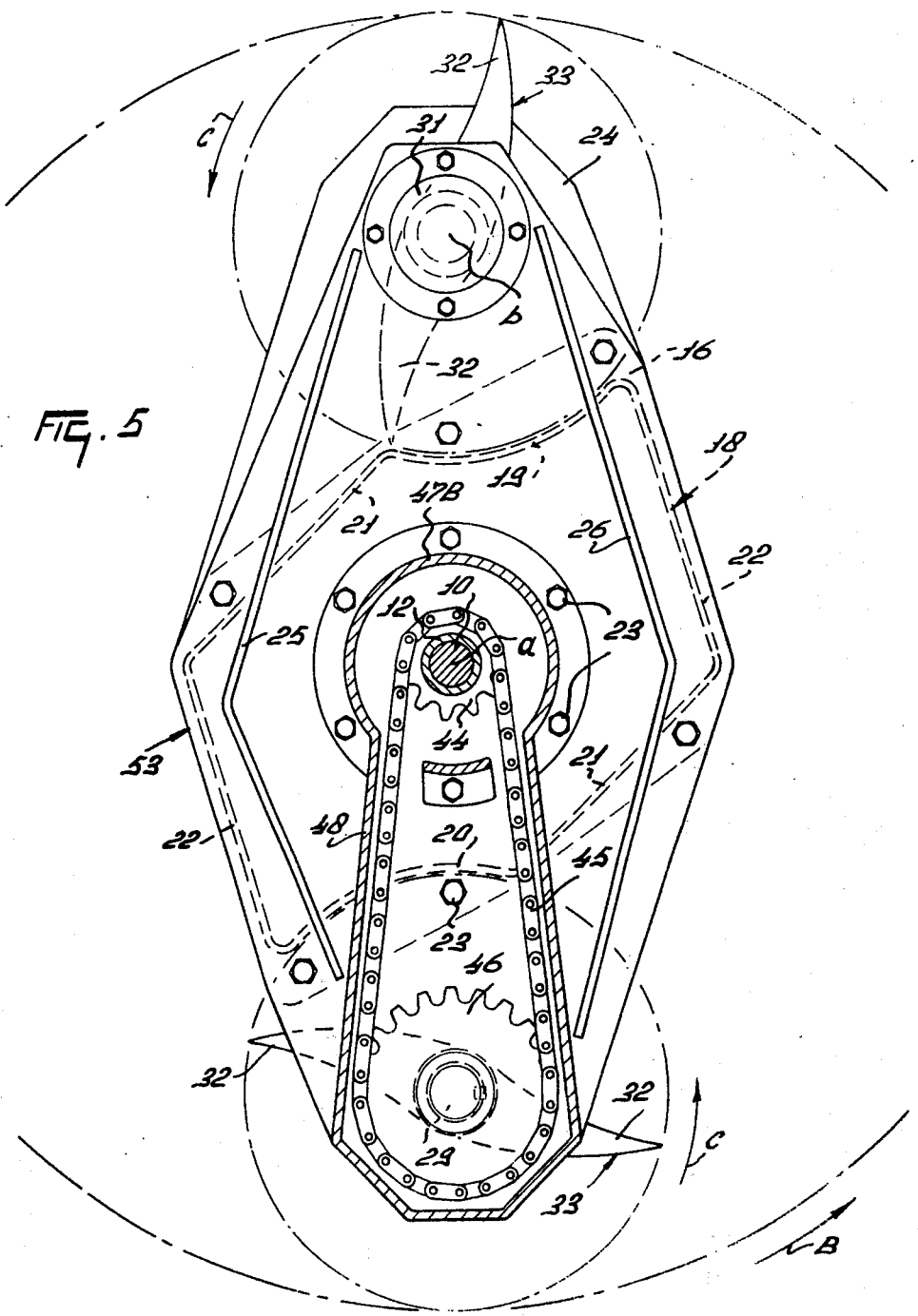

FIG. 1 is a plan view of a rotary plough in accordance with the invention mounted at the rear of an agricultural tractor, FIG. 2 is a side elevation corresponding to FIG. 1, FIG. 3 is a section, to an enlarged scale, taken on the line III—III of FIG. 1, FIG. 4 is a section, to an enlarged scale, taken on the line IV—IV of FIG. 1, FIG. 5 is a section taken on the line V—V of FIG. 4, FIGS. 6 to 9 inclusive are diagrams, to a reduced scale as compared with FIG. 5, illustrating successive positions of a soil working member of the rotary plough during the operation of the latter, FIG. 10 is an elevation illustrating and alternative tine construction and mounting for the rotary plough of FIGS. 1 to 9, FIG. 11 is a section taken on the line XI—XI of FIG. 10.

Figure 18:
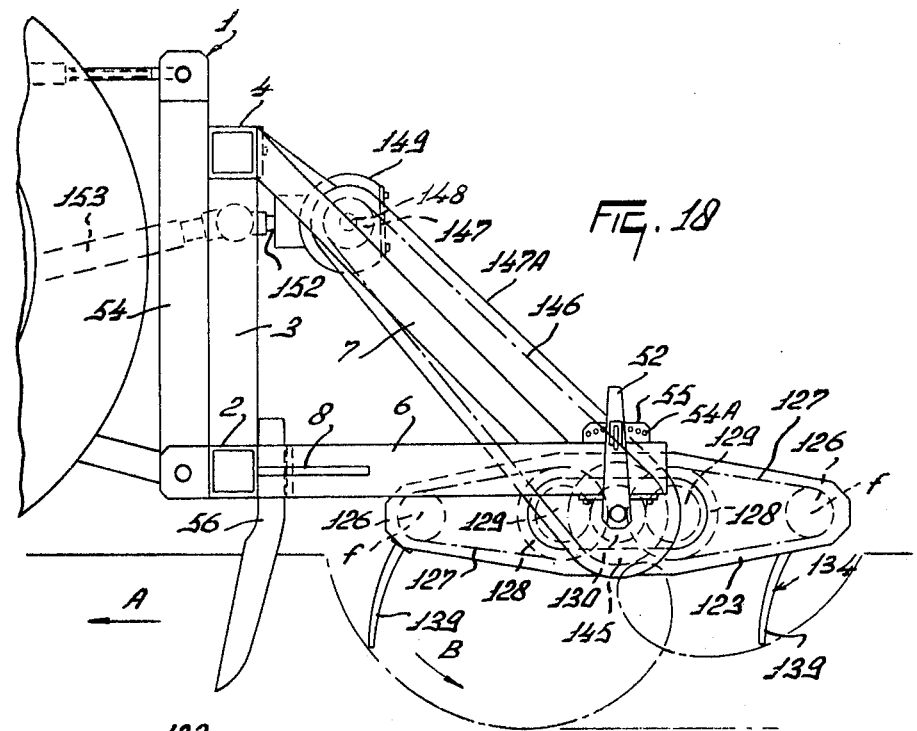

FIG. 12 is a plan view illustrating an alternative form of rotary plough in accordance with the invention mounted at the rear of an agricultural tractor, FIG. 13 is a side elevation corresponding to FIG. 12, FIG. 14 is a sectional elevation, to an enlarged scale, illustrating details of transmission and control mechanisms of the rotary plough of FIGS. 12 and 13, FIG. 15 is a part-sectional elevation, to an enlarged scale as compared with FIGS. 12 and 13, illustrating the construction and arrangement at one end of a soil working rotor of the plough, FIG. 16 is a section taken on the line XVI—XVI of FIG. 14, FIG. 17 is a plan view of a further alternative form of rotary plough in accordance with the invention mounted at the rear of an agricultural tractor, FIG. 18 is a side elevation corresponding to FIG. 17, FIGS. 19 to 22 inclusive are diagrams illustrating successive positions of a soil working member of a rotor of the plough of FIGS. 17 and 18, FIG. 23 is a part-sectional elevation, to an enlarged scale, showing the construction and mounting of a soil working tine of the plough of FIGS. 17 to 22 in greater detail, and FIG. 24 is an elevation as seen in the direction indicated by an arrow XXIV in FIG. 23.

Referring to FIGS. 1 to 9 of the drawings, a rotary plough, which may also be considered as being a cultivator, is illustrated that has a frame 1. The frame 1 includes a substantially horizontal frame beam 2 that extends perpendicular, or at least transverse, to the intended direction of operative travel of the rotary plough which is indicated by an arrow A in FIGS. 1 and 2 of the drawings. The frame beam 2 is hollow and preferably, as illustrated, has a square cross-section. The frame 1 includes a number of further hollow beams that will be mentioned below, each of those beams preferably also having a square cross-section. Substantially vertical beams 3 are rigidly secured to the opposite ends of the beam 2 so as to project upwardly therefrom and their upper ends, in turn, are rigidly interconnected by a further substantially horizontal beam 4 that extends parallel to the beam 2 but at a higher level than that beam. It will be noted from FIG. 1 of the drawings that a third substantially vertical beam 3 interconnects the beams 2 and 4 approximately midway along the lengths of the last-mentioned beams. Substantially horizontally disposed supporting beams 5 and 6 extend rearwardly with respect to the direction A from one of the free ends of the beam 2 and from a location spaced at a short distance from the other free end of the beam 2 respectively. Inclined strengthening beams 7 rigidly interconnect the beam 4 and the beam 5 and the beam 4 and the beam 6 respectively. A substantially horizontally disposed guard plate 8 of generally triangular configuration has two of its edges secured to the supporting beam 6 and the frame beam 2 (see FIG. 1).

Each of the supporting beams 5 and 6 is provided beneath a region adajcent its rearmost free end with a corresponding cylindrical supporting sleeve 9 (FIGS. 3 and 4) in which a corresponding end of a substantially horizontal shaft 10 is located in such a way that said shaft 10 extends parallel to the beams 2 and 4. Shouldered sleeves 11 and 12 that extend partly into the supporting sleeves 9 surround the shaft 10 at the ends of the two supporting sleeves 9 that are closest to one another. The relatively closest ends of said sleeves 11 and 12 are provided with horizontal bearings 13 whose outer races, in turn, are surrounded by housings 14A. The housings 14A are located at the opposite ends of a central tubular support 14 that rotatably surrounds a major portion of the length of the shaft 10.

The bearing housings 14A carry corresponding plates 16 and 17 that are contained in planes extending substantially perpendicular to the longitudinal axis $a$ of the shaft 10. The shapes of the plates 16 and 17 can be seen in FIG. 5 of the drawings in respect of the plate 16. The central tubular support 14 is surrounded between the plates 16 and 17 by a jacket 18 whose cross-sectional configuration can be seen in broken lines in FIG. 5. The jacket 18 comprises two portions 19 and 20 that are substantially diametrically opposite to one another with respect to the axis $a$ of the shaft 10 and each of them forms part of a corresponding substantially cylindrical sheath whose longitudinal axis is substantially parallel to, but substantially uniformly spaced apart from, the longitudinal axis $a$ of the shaft 10. Between the sheath portions 19 and 20, the jacket has portions 21 and 22 that are relatively inclined and that meet at two locations which are substantially diametrically at opposite sides of the axis $a$ of the shaft 10.

Plates 24 are fastened to the plates 16 and 17 by bolts 23, the shape of one of said plates 24 being visible in elevation in FIG. 5 of the drawings. The relatively remote sides of the two plates 24 are provided with stiffening ribs 25 and 26 and, near their uppermost and lowermost ends as seen in the drawings, the plates 24 are interconnected by tubular supports 27 that are rotatable with respect to the plates 24 by means of stub shafts 28 and 29 rotatably mounted in ball bearings 30 and 30A (FIG. 4) contained in closed housings 31 and 31A (FIG. 3). The housings which have just been mentioned are secured to the supports 27 whose longitudinal axes $b$ (FIGS. 3 and 4) also constitute the axes of rotation thereof. It should be noted that the two axes $b$ and the single axis $a$ are all contained in a single plane. Moreover, the axes $b$ also coincide with the centers of curvature of the jacket portions 19 and 20. Each of the supports 27 is provided at regular intervals, which may conveniently be substantially 10 centimeters, along its length with tines 32 that are arranged in two rows. The rows of tines 32 extend parallel to the axes $b$ and, although each tine 32 is curved to some extent, it extends substantially perpendicular to the corresponding axis $b$. It can be seen from FIG. 5 of the drawings that the two rows of tines 32 corresponding to each tine support 27 are offset from one another at substantially 180° around the corresponding axis $b$. Each slightly curved tine 32 tapers to a point at its free end or tip and it will be seen from FIG. 5 that the curvature is such as to direct each tine 32 forwardly to a small extent with respect to the intended directions of rotation C of both supports 27 and their tines 32. The radial lengths of the tines 32 are such that their tips pass very close to the cylindrically curved portions 19 and 20 of the jacket 18. It will be seen from FIGS. 3 to 5 of the drawings, which are all to the same scale, that the tines 32 are wider in directions parallel to their planes of rotation at their root ends than they are thick (in directions parallel to the axes $b$) at the same ends. Each support 27 with the corresponding two rows of tines 32 constitutes a soil working member that is generally indicated by the reference 33, each soil working member being rotatable about the corresponding axis $b$.

A ring 24A is fastened to the plate 17 by the same bolts 23 that interconnect the plates 17 and 24. The ring 24A integrally carries a sprocket wheel 34 at the end of said ring remote from the plates 24 and 17, the sprocket wheel 34 being linked to a further sprocket wheel 36 by a transmission chain 35. The sprocket wheel 36 is carried on a shaft 37 that is journalled in a gear box 38 so as to extend parallel to the shaft 10. The gear box 38 (FIGS. 1 and 2) is fastened to a bracket 39 carried by the frame beam 4. The shaft 37 is provided, inside the gear box 38, with a bevel pinion 40 whose teeth are in driven mesh with those of a further bevel pinion 41 carried by a shaft 42 which has a splined or otherwise keyed portion that projects forwardly from the gear box 38 in substantially the direction A to serve as a rotary input shaft. The sprocket wheels 34 and 36 and the transmission chain 35 are arranged in a protective casing 43. The two sleeves 11 and 12 (FIGS. 3 and 4) are both integrally provided with corresponding sprocket wheels 44 and these sprocket wheels are linked by corresponding transmission chains 45 to sprocket wheels 46 mounted on, or integral with, the two stub shafts 29 at the ends of the two tubular tine supports 27. It will thus be seen that the two tine supports 27 are driven from their ends and that those ends are located at the opposite sides of the rotary plough or cultivator. The two chain and sprocket wheel assemblies 44/46 are surrounded by corresponding protective casings 47 and 47A, said casings extending between projecting rims 48 of the plates 24 and the ring 24A and a corresponding but smaller ring 47B (FIGS. 4 and 5) near the opposite end of the shaft 10 from the ring 24A.

The relatively remote ends of the sleeves 11 and 12 (FIGS. 3 and 4) are formed with steps 49 and these steps are arranged to co-operate with matchingly shaped steps at the inner ends of short sleeves 50 that surround the outermost opposite ends of the shaft 10, said sleeves 50 being secured to the shaft 10 by axial bolts 51. The steps 49 and bolts 51 fix the sleeves 11 and 12 in place relative to the shaft 10 but the construction is such as to be capable of being readily assembled or disassembled when required. Each of the two sleeves 50 carries a corresponding upwardly projecting lever 52 which levers can be employed to turn those sleeves, together with the sleeves 11 and 12 and the shaft 10, about the axis $a$ of said shaft. The levers 52 and the parts which have just been mentioned can be retained in any chosen one of a number of different angular settings around the axis $a$ by means of spring-loaded substantially horizontal locking pins 53A which those levers carry, the tips of said locking pins 53A being capable of being entered through any chosen ones of curved rows of holes 54A formed in upright strips 55 mounted on top of the supporting beams 5 and 6. Upon turning the levers 52 angularly around the axis $a$, the sprocket wheels 44 are turned with the shaft 10 so that the chains 45 also cause the tine supports 27 to turn about their axes $b$. The tubular support 14, the plates 24 and the soil working members 33 together constitute a rotor which, during the operation of the rotary plough or cultivator, can be revolved in the direction B shown in FIGS. 2 and 5 of the drawings by way of the sprocket wheel 34 and the other transmission parts which have been described. The two soil working members 33 are controlled by the transmission members 44 to 46 inclusive and rotate the tubular supports 27 of those members 33 in the directions C shown in FIGS. 2 and 5 of the drawings in such a way that, at any given angular position of the whole rotor around the axis $a$, the two soil working members 33 will occupy specific corresponding angular positions about the two axes $b$. The arrangement is, in fact, such that, when one of the soil working members 33 is in a lowermost position as shown in FIGS. 2 and 5 of the drawings, one of its rows of tines 32 will be disposed with the points thereof projecting forwardly in substantially the direction A. A transmission ratio of 1 : 2 exists between the sprocket wheels 44 and 46 so that each soil working member 33 turns about the corresponding axis $b$ through 180° while the whole rotor revolves through 360°. The protective casings 47 and 47A afford, together with the registering portions of the two plates 24, supporting arms for the soil working members 33, said arms housing the control mechanisms that comprise the transmissions 44/46.

The front of the frame 1 has a generally triangular coupling member or trestle 54 rigidly secured to it to enable the cultivator or rotary plough to be connected to the free ends of the lifing links of a three-point lifting device or hitch carried by an agricultural tractor or other operating vehicle in the manner which can be seen in outline in FIGS. 1 and 2 of the drawings. As can be seen in FIG. 1 of the drawings, the coupling member or trestle 54 is located at one lateral side of the rotary plough or cultivator with respect to the direction A so that, during operation, a strip of land will be worked that is offset to one side of, but in overlapping relationship with, the path of travel of the operating tractor or other vehicle. It will be noted from FIG. 2 of the drawings that the lower connection points of the coupling member or trestle 54 are located in front of the upright frame beams 3 with respect to the direction A and that the single upper connection point is at a higher horizontal level than the upper substantially horizontal frame beam 4. Holders 55A for upwardly and downwardly adustable coulters 56 are provided in the corners between the beams 4 and 5 and 4 and 6 respectively.

In the use of the rotary plough or cultivator that has been described, its coupling member or trestle 54 is connected to the three-point lifting device or hitch of an agricultural tractor or other operating vehicle in the manner that can be seen in outline in FIGS. 1 and 2 of the drawings and the forwardly projecting end of the shaft 42 is placed in driven connection with the power take-off shaft of the same tractor or other operating vehicle be way of an intermediate telescopic transmission shaft 57 of a construction that is known per se having universal joints at its opposite ends. As the rotary plough or cultivator is moved over the soil in the direction A, the rotary drive that is imparted to the shaft 42 causes the whole rotor to revolve in the direction B shown in FIGS. 2 and 5 of the drawings and the soil working members 33 to rotate simultaneously in the directions C around the corresponding axes $b$. It is preferred that the rotor should rotate at a speed of between substantially 150 and substantially 200 revolutions per minute, the transmission being so arranged that, as previously mentioned, the tines 32 of one row are pointing forwardly in substantially the direction A as they pass trough the soil when the corresponding member 33 is at substantially the lowermost point of its path of bodily rotation around the axis $a$.

FIGS. 6 to 9 inclusive of the accompanying drawings illustrate four different angular dispositions of one of the soil working members 33 around the axis $a$ of the shaft 10. It will be remembered that, while being bodily displaced around the axis $a$, each soil working member 33 is simultaneously rotating in the direction C around the corresponding axis $b$ and FIGS. 6 to 9 of the drawings show the relationship of one row of tines 32, constituting active parts or soil working portions of the corresponding member 33, to a slice of earth. FIG. 6 illustrates the condition in which the row of tines 32 first penetrate into the ground surface to loosen the slice from the surrounding soil, the width of said slice substantially corresponding to the perpendicular distance between the coulters 56 (see FIG. 1). As the member 33 moves onwardly towards the position shown in FIG. 7 of the drawings, the slice is fully loosened from the surrounding soil and is supported from beneath by the row of tines 32, said tines then pointing forwardly in substantially the direction A. The other row of tines 32 of the same soil working member point substantially rearwardly with respect to the direction A at the same instant. During the movement of the soil working member 33 from the position shown in FIG. 6 to that shown in FIG. 7, the surrounding substantially undisplaced soil tends to scrape off any dirt, root debris and the like that may be adhering to the row of tines 32 that, at such time, are pointing generally rearwards with respect to the directions A and B. The rows of tines 32, which are successively operative and inoperative, are thus substantially selfcleaning during their inoperative periods.

Once the soil working member 33 under consideration has reached the position around the axis $a$ of the shaft 10 that is shown in FIG. 7 of the drawings, the slice of soil has been lifted completely clear of the undisplaced earth and it will be realised that, at this time, one of the rows of tines 32 of the other soil working member 33 occupies the position shown in FIG. 6 of the drawings and is commencing to loosen a further slice of soil. When the soil working member 33 under consideration reaches the position shown in FIG. 9 of the drawings at which its axis of rotation $b$ is substantially vertically above the axis of rotation $a$ of the whole rotor, gravity starts to cause the supported slice of soil to fall downwardly along the tines 32 and onto the inclined portion 21 of the jacket 18. The freed slice of soil falls back into the excavated furrow in a substantially inverted condition, a further slice of soil having been displaced from the ground by one of the rows of tines 32 of the other member 33 by the time that the slice under consideration has fallen back into the furrow. It will be realised that, while the soil working member 33 under discussion occupies the position shown in FIG. 9 of the drawings, the other soil working member 33 will be in the position shown in FIG. 7 of the drawings.

In the use of the rotary plough or cultivator of FIGS. 1 to 5 of the drawings, the active parts or soil working portions of the soil working members 33 that are afforded by their tines 32 gradually loosen successive slices of soil in a regular manner and displace those slices upwardly and rearwardly over the axis $a$ with respect to the direction A. Inversion of each slice is involved in this displacement and the inverted slices fall back to the bottom of the excavated furrow in a substantially inverted condition. The two rows of tines 32 of each soil working member 33 are alternately active and inactive and, as has been discussed above, the surrounding substantially undisplaced soil co-operates with the tines 32 that are trailing and inactive to scrape those tines automatically clear of adhering dirt, root debris and the like. When each soil working member 33 is at substantially its lowermost position around the axis $a$ (FIGS. 2, 5 and 7), the two rows of tines 32 that project in opposite directions with respect to the corresponding axis $b$ are pointing respectively forwardly and rearwardly with reference to the direction A.

The rotary harrow or cultivator may have to work with soils having differing degrees of hardness and differing moisture contents and the optimum angle of attack of the tines 32 to loosen a slice of soil varies in consequence. For example, a different angle of attack is desirable when the soil has a hard crust as compared with that required when the soil is in a soft and wet condition. The angle of attack of the tines 32 to penetrate into and loosen the successive slices of soil can be changed by turning the levers 52 around the axis $a$. As previously described, such adjusting movements of the levers 52 turn the tine supports 27 about the axes $b$ with a consequent increase or decrease in the angle of attack of the tines 32 in the position shown in FIG. 6 of the drawings. The instant of loosening of each slice of soil can thus be advanced or delayed in relation to the angular position of the corresponding soil working member 33 around the axis $a$. It should be noted that the curved surfaces that are afforded by the parts 19 and 20 of the jacket 18 act as scraping or shedding surfaces during operation of the rotary plough or cultivator and tend to free the points of the tines 32 from any adhering soil, root debris or the like.

FIGS. 10 and 11 of the drawings illustrate a tine construction and mounting that could be used in, for example, the soil working members 33 that have been described with reference to FIGS. 1 to 5 of the drawings. FIGS. 10 and 11 of the drawings illustrate tines 58 that are made in integral pairs, each pair having a shallow S-like configuration when seen in side elevation (FIG. 11). The tines have active or soil working portions 59 that are located at opposite ends of a single fastening portion 60, said portion 60 being of a polygonal, and preferably square, cross-section. The tines 58 are carried by a rotary support 64 which comprises two matching portions 63 that fit together to give the support 64 a substantially oval cross-section (FIG. 11). The tines 58 are entered through holes formed in the junction edges of the two support portions 63 and are maintained in their appointed positions by transverse bolts 61, provided with corresponding nuts, the heads of the bolts 61 and their co-operating nuts being received in depressions 62 in the support portions 63 and the shanks of said bolts being entered through transverse bores in the tine fastening portions 60 that are formed midway along the lengths of those portions. Once the bolts 61 are tightened, the tines 58 are retained firmly in their appointed positions and cannot turn about the axes of the common fastening portions 60. The two support portions 63, one of which is detachable from the other (i.e. the left-hand portion as seen in FIG. 11 of the drawings), are also firmly clamped to one another once the bolts 61 are tightened. The arrangement of the heads of the bolts 61 and their co-operating nuts in the depressions 62 prevents them from projecting to any appreciable extent so that there is a reduced tendency for root debris and the like to adhere to them. The active or soil working portions 59 of the tines 58 are also of a polygonal, and preferably rectangular, cross-section throughout their lengths, said portions tapering towards their free ends or tips. With the rectangular, in cross-section, construction of each portion 59 that is illustrated, each of the four sides of each portion 59 is formed with four concave or at least hollow grooves or recesses 65 throughout substantially the whole of its length. The soil working portions 59 of the tines 58 are flattened to some extent towards their free ends or tips so that, with the rectangular cross-sectional configuration that is illustrated, a diagonal between two opposite corners (in cross-section) taken at a point near the tip of each portion 59 has a different magnitude to a diagonal taken between the opposite two corners at the same point. The arrangement is such that the longer diagonal extends substantially parallel to the axis of rotation of the support 64 which axis corresponds to one of the axes $b$ in the preceding embodiment.

The curvatures of the soil working portions 59 of the tines 58 are such that the free ends or tips thereof are directed forwardly with respect to the intended direction of rotation C (FIG. 11). The curvature of each portion 59 is uniform and the construction and arrangement of the tines is such as to provide very good penetration of those tines into the soil particularly when working under adverse conditions in which heavy and wet soil is met with. Under such conditions, the successive slices of soil are readily loosened and the slices are effectively supported from beneath by the concave or hollow sides of the curved tines during lifting of the slices from the surrounding undisplaced soil.

FIGS. 12 to 16 of the drawings illustrate an alternative rotary plough or cultivator in accordance with the invention, said plough or cultivator having a frame 67 which is afforded principally by an assembly of hollow beams that preferably have a square cross-section as in the preceding embodiment. The frame 67 comprises a substantially horizontal beam 68 (FIG. 13) that extends substantially perpendicular to the intended direction of operative travel of the rotary plough or cultivator which is again indicated by an arrow A. Four substantially vertical beams 69 projects substantially vertically upwards from the beam 68 at locations at the opposite ends of the latter beam and at two intermediate locations therealong, the four locations being regularly spaced apart from one another. The upper ends of the four substantially vertical beams 69 are interconnected by a substantially horizontal beam 70 that extends parallel to the beam 68. substantially horizontally disposed supporting beams 71 and 71A extend rearwardly with respect to the Direction A from the free ends of the beam 68 and inclined strengthening beams 72 rigidly interconnect the supporting beam 71 and the neighbouring beam 69 and the supporting beam 71A and the neighboring beam 69, the connections of the beams 72 to the beams 69 being located immediately beneath the level of the beam 70. Each of the supporting beams 71 and 71A is provided beneath a region adjacent its rearmost free end with a corresponding cylindrical supporting sleeve 73 (FIGS. 14 and 15) in which a corresponding end of a substantially horizontal shaft 74 is located in such a way that said shaft 74 extends parallel to the beams 68 and 70. The shaft 74 carries two soil working rotors 75 and 75A which rotors are arranged in side-by-side relationship with both of them fastened to a common tubular support 76 that rotatably surrounds a major portion of the length of the shaft 74, said support 76 being rotatably and concentrically arranged around the longitudinal axis $c$ of the shaft 74 with the aid of ball bearings 77 and surrounding bearing housings 77A (FIG. 14). Each end of the central tubular support 76 is provided with a corresponding flange 78 and plates 80 are secured to those flanges by small bolts 79 in such a way that the planes of both plates 80 are perpendicular, or substantially perpendicular, to the longitudinal axis $c$ of the shaft 74. As can be seen best in FIG. 15 of the drawings, each plate 80 is elongated in one direction and it should be noted that, when the two plates 80 are viewed lengthwise of the axis $c$, the greatest dimension of one of them is turned through substantially 90° around that axis relative to the same dimension of the other plate. Opposite end regions of the two elongated plates 80 are provided with bearing housings 81 which housings receive ball bearings 82 in which stub shafts 83 are rotatably but indirectly mounted. The stub shafts 83 are located at the ends of tubular tine supports 84 whose opposite ends carry further stub shafts 83 that are directly rotatably mounted in bearing housings 86 by way of ball bearings 85. There are four of the bearing housings 86 and all of them are carried by a supporting plate 87 that extends parallel to the two plates 80 at a location midway therebetween and thus perpendicular or substantially perpendicular to the axis $c$. As will be evident from the drawings, the supporting plate 87 is welded or otherwise rigidly secured to the tubular support 76 at a location midway along the length of the latter, the four bearing housings 86 being spaced apart from one another 90° intervals around the axis $c$. The supporting plate 87 is of generally cruciform configuration (see FIG. 13), the four bearing housings 86 being supported by the four arms of the plate. The positions of the bearing housings 81 and 86 are such that each of the four tubular tine supports has a combined longitudinal axis and axis of rotation $d$ that extends parallel to the axis $c$ of the shaft 74. The arrangement is such that the longitudinal axes $d$ of the pair of tine supports 84 can be seen in FIG. 14 of the drawings are coplanar with the longitudinal axis $c$ of the shaft 74 while the longitudinal axes $d$ of the other pair of tine supports 84 that are not shown in FIG. 14 of the drawings are also coplanar with the longitudinal axis $c$ of the shaft 74, the two planes that have just been mentioned being perpendicular to one another with their line of intersection coinciding with the axis c. The arrangement that has just been described will be evident from an inspection of FIG. 13 of the drawings. All four of the axes d are equidistant from the axis c.

Each of the plates 80 is provided with a pair of screw-threaded bolts 88 that are located at equal distances from the axis c at opposite sides of that axis. Each bolt 88 extends parallel to the axes c and d and is provided with a retaining nut 89. FIGS. 14, 15 and 16 of the drawings show the heads 101 of the bolts 88 and it will be evident from the last of those Figures that the longitudinal axes of the two bolts 88 that correspond to each plate 80 are contained in the same plane as the axis c and the corresonding pair of axes d. Instead of employing the screw-threaded bolts 88 that have been described, screw-threaded studs may be substituted in co-operation with the nuts 89 and further nuts replacing the bolt heads 101. The shank of each bolt 88 is rotatably surrounded by a corresponding sleeve 91 through the intermediary of a pair of ball bearings 90 and a mounting sleeve immediately embracing said shank. That end of each sleeve 91 which is closest to the corresponding plate 80 carries a corresponding sprocket wheel 92 and the opposite end thereof carries a toothed pinion 93. Each sprocket wheel 92 is linked by a corresponding transmission chain 94 to a corresponding sprocket wheel 95 that is secured to a sleeve 96 fastened to the stub shaft 83 at the end of one of the tubular tine supports 84. The two pinions 93 that correspond to one of the plates 80 have their teeth in driven connection with those of an intervening pinion 97, the two pinions 97 being fastened to sleeves 98 (FIG. 14) and 98A (FIG. 15) that are fixed to opposite end regions of the shaft 74 so as to be angularly immovable relative to that shaft. As can be seen in the two drawings which have just been mentioned, each of the sleeves 98 and 98A extends through the corresponding surrounding supporting sleeve 73 for about half the axial length of that supporting sleeve. The toothed pinions 93 and 97 are of the same size so that there is a transmission ration of 1 : 1 between them but the sprocket wheels 92 have 1,5 times the number of teeth of the sprocket wheels 95 so that there is a transmission ratio of 3 : 2 between (see FIG. 16). The edge of each of the plates 80 has a perpendicularly and outwardly bent over rim 99 and corresponding cover plates 100 engages said rims 99 and enclose the toothed pinion and chain and sprocket wheel transmission that have just been described. The cover plates 100 are maintained in their appointed positions by the heads 101 of the bolts 88 or by the nuts which can be employed as an alternative in the manner described above. As in the preceding embodiment, each of the four tine supports 84 is provided with two diametrically opposed rows of tines that are again indicated by the reference 32 since their construction and arrangement is substantially identical to that already set forth in detail with reference to FIGS. 1 to 9 of the drawings.

Outermost end regions of the shaft 74 are surrounded by sleeves 102 which are keyed to the shaft so as to be non-rotatable relative thereto, the sleeves 102 being received internally of the cylindrical supporting sleeves 73 that are of larger diameter. Axial displacements of the sleeves 102 relative to the shaft 74 are prevented by corresponding bolts 103 (FIG. 15), the heads of which bolts also secure upwardly extending levers 104 to the ends of the shaft 74. As can be seen in the drawings, the levers 104 carry spring-loaded locking pins 53A that are arranged to co-operate with chosen holes 54A in strips mounted on top of the supporting beams 71 and 71A, the parts 53A, 54A and 55 being substantially identical in construction and arrangement to the equivalent parts that have been indicated by the same reference numerals in the preceding embodiment. Angular displcements of the levers 104 about the axis c cause a similar angular displacement of the shaft 74 and consequential angular displacements of the tubular supports 84 that carry the tines 32, such displacements being effected through the pinion and chain and sprocked wheel transmissions one of which can be seen in elevation in FIG. 16 of the drawings. The rotors 75 and 75A that have previously been mentioned each comprise two working members 105 which members 105, in turn, each comprise one of the tubular supports 84 and its two substantially diametrically opposed rows of tines 32. As previously mentioned, the two working members 105 of the rotor 75 are angularly offset from those of the rotor 75A around the longitudinal axis c of the shaft 75 by 90°. The pinion and chain and sprocket wheel transmissions that comprise the parts 92 to 97 form members of a control mechanism that is accommodated in the arms that are afforded by the two elongated supporting plates 80 and their co-operating cover plates 100. The control mechanism that has just been mentioned determines the angular settings of the tines 32 of the working members 105 around the d at various positions of the whole rotors 75 and 75A around the axis c. Due to the transmission ratio of 3 : 2 which exists between the sprocket wheels 92 and 95, each tubular tine support 84 will turn 1,5 times around the corresponding axis d during one complete rotation of the corresponding rotor 75 or 75A around the axis c.

A ring 106 is secured to the cover plate 100 that is disposed close to the supporting beam 71A, the axial end of said ring 106 which is furthest from the cover plate 100 in question having a sprocket wheel 107 rigidly secured to it. A transmission chain 108 is passed around the sprocket wheel 107 and around a further smaller sprocket wheel 109 mounted at the end of a shaft 110 that extends parallel to the frame beam 70 at a location just beneath that frame beam and rearwardly thereof with respect to the direction A. The shaft 110 extends axially through a tubular casing 111 carried by brackets 112 fastened to the rear of the frame beam 70. The sprocket wheels 107 and 109 and the co-operating transmission chain 108 are contained within a protective casing 113. The end of the shaft 110 that is remote from the sprocket wheel 109 is located in a gear box 114 where it carries a bevel pinion 115. The teeth of the bevel pinion 115 are in driven mesh with those of a further bevel pinion 116 mounted on a shaft 117 which extends substantially parallel to the direction A and whose leading end with respect to that direction is splined or otherwise keyed and is arranged to project forwardly from the front of the gear box 114 to afford a rotary input shaft for the power driven mechanisms of the rotary plough or cultivator.

Holders 118 for soil-slicing coulters 119 are provided at the angular junctions between the frame beam 68 and the supporting beams 71 and 71A respectively. A further holder and co-operating coulter are also provided midway between the two coulters 119 at a location beneath the front of the gear box 114, the parts which have just been mentioned being visible in FIG. 12 of the drawings. Each of the holders 118 is provided with a set bolt or the like so that the corresponding coulters 119 can be retained in chosen vertical settings relative to those holders and thus to the frame 67 of the rotary plough or cultivator. The front of the frame 67 with respect to the direction A is provided substantially midway across its width with a coupling member or trestle 120A of generally triangular configuration. The coupling member or trestle 120A is arranged so it can be employed in connecting the rotary plough or cultivator to the three-point lifting device or hitch of an operating agricultural tractor or other vehicle in the manner which can be seen in outline in FIGS. 12 and 13 of the drawings. It should be noted that the lower connection points of the coupling member or trestle 120A are disposed at substantially the same level as the beam 68 and substantially in register with the two vertical beams 69 that are spaced inwardly from the opposite sides of the plough or cultivator. The single upper connection point is located substantially centrally across the width of the plough or cultivator just in front of the beam 70 and at a horizontal level a little above that of the beam 70.

In the use of the rotary plough or cultivator that has been described with reference to FIGS. 12 to 16 of the drawings, the coupling member or trestle 120A is connected to the three-point lifting device or hitch at the rear of an operating agricultural tractor or other vehicle in a manner which is generally known per se and which can be seen in outline in FIGS. 12 and 13 of the drawings. The leading forwardly projecting end of the shaft 117 is placed in driven connection with the power take-off shaft of the same tractor or other vehicle by way of an intermediate telescopic transmission shaft 121A of known construction having universal joints at its opposite ends. The coulters 119 are adjusted to height settings appropriate to the nature and condition of the soil that is to be dealt with. The central tubular support 76 is rotated around the shaft 74 from the gear box 114 by the chain and sprocket wheel transmission 107–109 and the rotors 75 and 75A are thus caused to rotate together around the axis c in the direction B indicated in FIGS. 13 and 16 of the drawings. As the plough moves over the soil in the direction A, the working members 105 of the two rotors 75 and 75A also rotate about the corresponding axes d in the directions C that are indicated in FIGS. 13 and 16 of the drawings. It will be remembered that each tine support 84 will rotate 1,5 times around the corresponding axis d while the whole of the corresponding rotor 75 or 75A rotates once around the axis c. As the tines 32 of each working member 105 first penetrate into the soil as that member moves downwardly into engagement with said soil in the direction B, those tines will occupy substantially the position indicated by the reference D in FIG. 13. As movement of the whole rotor 75 or 75A continues in the direction B, rotation of the working member 105 under consideration also continues in the direction C, and when that member 105 has reached the position indicated by the reference E in FIG. 13, its tines 32 will occupy substantially the angular locations that are illustrated. The row of tines 32 that originally cut loose a slice of soil between the corresponding pair of earth slicing coulters 119 continue to disengage that slice from the surrounding soil and to move it upwardly around the corresponding axis d. The position E illustrated in FIG. 13 of the drawings is a lowermost position of one of the working members 105 and, in that position, the row of tines 32 which is effective is pointing rearwardly with respect to the direction A while its other row of tines 32, which are not then effective, are pointing more or less forwardly with respect to the direction A. When the rotor 75 or 75A has turned through a further 90° around the axis c, the working member 105 under consideration will have arrived at the position indicated by the reference F in FIG. 13 of the drawings. In this position, the row of tines 32 that had been carrying along the loosened slice of earth is pointing substantially forwardly with respect to the direction A so that gravity will cause the slice of earth to fall from beneath the previously supporting row of tines 32 back into the cavity excavated by the rotary plough or cultivator, said slice of earth being returned to substantially the location from which it was removed but in a substantially inverted condition.

A further 90° displacement around the axis c of the rotor 75 or 75A brings the working member 105 under consideration to the position G illustrated in FIG. 13 of the drawings in which position both of its rows of tines 32 are substantially free of engagement with soil. It will be seen from FIG. 13 of the drawings that, when the position G has been reached, the working member under consideration is in an uppermost location as regards its path of bodily displacement around the axis c. The member 105 moves on from the position G in the direction B until it again reaches the position D that has been described above and that is the foremost position around the axis c which it can attain with respect to the direction A. A row of the tines 32 again penetrates downwardly into the soil to loosen a fresh slice of earth but it will be noted that the "operative" row of tines in this case is the row thereof that was "inoperative" when the member 105 under discussion was previously in the position D because said working member has rotated 1,5 times around the corresponding axis d during the simultaneous movement of the whole rotor 75 or 75A around the axis c, the two rows of tines 32 of each working member 105 being 180° removed from one another around the corresponding axis d. Each row of tines 32 is thus alternately "active" and "inactive" and one of the results of this is that, each time one of the rows of tines 32 is an "inactive" row, it moves downwardly into freshly sliced soil behind the corresponding "active" row so that adhering soil, stones, root debris and the like from the preceding "active" operation tend to be stripped off or shed from those tines and left buried in the ploughed or cultivated soil.

The construction that has been described with reference to FIGS. 12 to 16 of the drawings provides a very effective rotary plough having two neighboring rotors each of which has working members at its periphery that can be rotated around corresponding individual axes. The arrangement is such that, during major portions of the bodily displacements of each working member 105 through 360° around the axis c, active parts (i.e. the alternate rows of tines 32) project beyond a circle which, as seen in side elevation (FIGS. 13 and 16), is centered upon the axis c and intersects the four axes d. Each working member 105 loosens successive slices of earth in a uniform manner during the movement of the rotary plough or cultivator in the direction A, each slice being substantially inverted and being replaced in that condition at substantially the location from which it was cut. As in the preceding embodiment, the provison of each working member with two rows of diametrically opposed tines 32 enables each row of tines to serve an "active" and an "inactive" function alternately, adhering soil, stones, root debris and the like after an "active " operation, tending to be stripped or shed from the tines during their following "inactive" phase as they are moved through the soil in a direction tending to displace adhering material towards their free ends or tips. Each of the rotors 75 and 75A has a width in a direction parallel to the axis $c$ of substantially 100 centimeters and has a working diameter that is preferably not less than 50 centimeters and not greater than 90 centimeters. The effective working width of the rotary plough or cultivator of FIGS. 12 to 16 of the drawings is substantially 210 centimeters. The angular staggering of the two rotors through 90° around the axis $c$ ensures that the plough or cultivator operates quite regularly during ploughing or cultivating without any disadvantageous amount of "drag and snatch". As in the embodiment of FIGS. 1 to 9 of the drawings, the alternative tines described with reference to FIGS. 10 and 11 thereof may be substituted for the tines that have been described. It should also be noted that, in both of the embodiments that have been described, the tines 32 may be replaced by tines having a broader extent in directions parallel to the axes $c$ and $d$ so that said tines will apply a greater displacing force to the soil. The use of such broader tines is desirable with soils of low cohesion, such as loose sandy soils.

The levers 104 at the opposite lateral sides of the rotary plough or cultivator are employed in the same manner as the equivalent levers in the preceding embodiments to enable the angular settings of the tines 32 of each working member 105 around the corresponding axis $d$ to be varied for a given angular position of the whole member 105 around the axis $c$. This facility for adjustment enables the angle of attack or penetration of the tines 32 into the soil to be increased or reduced and can be employed to advance or retard the instant at which each slice of soil is dropped back from the tines 32 as each member 105 reaches the appropriate position (approximately the position F shown in FIG. 13) around the axis $c$. Appropriate adjustments can thus be made to ensure that the rotary plough or cultivator will operate in an optimum manner with soils of different natures, consistancies, moisture contents and or weed or other plant contents. The actual way in which the soil is worked is influenced by the settings of the levers 104 with particular reference to the instants at which the tines 32 redeposit the slices of soil which they cut.

FIGS. 17 and 18 of the drawings illustrate a rotary plough or cultivator having a frame 1 which is substantially identical in construction and arrangement to the frame 1 of the rotary plough or cultivator of FIGS. 1 to 9 of the drawings. Accordingly, it should be noted that those parts which are indicated in FIGS. 17 and 18 of the drawings by reference numerals which have already been employed in FIGS. 1 to 9 of those drawings are similar or identical to the equivalent parts that have already been described above and illustrated in FIGS. 1 to 9. A shaft 121 extends parallel to the frame beams 2 and 4 beneath the rear ends of the supporting beams 5 and 6 with respect to the direction A and is carried in cylindrical supporting sleeves 120 similar to the previously described sleeves 9. A central tubular support 122 is arranged around the shaft 121 and its opposite ends are carried by bearings in such a way that it can rotate around said shaft. The housings of the bearings which have just been mentioned carry support plates 123 whose general planes are perpendicular to the longitudinal axis $e$ of the shaft 121 and which plates, as can be seen in FIG. 18 of the drawings, are of elongated shape. Tine supports 124 extend parallel to the axis $e$ between the ends of the two support plates 123 at equal distances from said axis. The tine supports 124 have stub shafts 125 at their opposite ends and those stub shafts are rotatably mounted in bearings carried by housings that are fastened to the support plates 123. The axes of rotation $f$ of the tine supports 124 are both parallel to the central axis $e$ of the shaft 121 and the three axes which have just been mentioned are coplanar. The stub shafts 125 at the same ends of the tine supports 124 are both provided with sprocket wheels 126 and those sprocket wheels 126 are embraced by transmission chains 127 that also extend around larger sprocket wheels 128 which are rotatable around stub shafts 129A mounted on the corresponding support plate 123 in positions which are such as to define rotary axes extending parallel to the axes $e$ and $f$ and so as to be coplanar with those axes. Each sprocket wheel 128 has a toothed pinion 129 secured alongside it so as to be rotatable around the axis of the same stub shaft 129A and it will be seen from the drawings that the teeth of the two pinions 129 are both in mesh with those of an intervening pinion 130 that is of the same size as each of the two pinions 129. The pinion 130 is mounted on a sleeve 131 which surrounds the shaft 121 inside the corresponding cylindrical supporting sleeve 120. The pinions 126 and 128, the chains 127 and the pinions 129 and 130 are all located beneath a cover plate or casing 132 which co-operates with the perpendicularly bent over rim 133 of the adjacent support plate 123.

As in both the preceding embodiments, the lever 52 which is provided at only one end of the shaft 121 with this construction can be displaced angularly around the axis $e$ and can be retained in chosen angular settings around that axis by the locking pin that co-operates with chosen holes 54A in the strip 55. Such angular adjustment of the shaft 121 around its axis $e$ causes the toothed pinion and chain and sprocket wheel transmissions that extend between that shaft and the two tine supports 124 to move those latter supports angularly to consequential extents around the axes $f$. It will be noted that the support plate 123 at the ends of the shaft 121 remote from the transmissions that have just been mentioned also has a perpendicularly bent over rim 133 but that a cover plate or casing equivalent to the plate or casing 132 is not needed at that end.

In this embodiment, each tine support 124 carries only a single row of tines 134 which tines constitute the active parts of a corresponding working member 135, there accordingly being two such working members 135 that form parts of a single rotor 136 that revolves around the axis $e$ during the use of the rotary plough or cultivator. Each working member 135 is rotatable about the corresponding axis $f$ and its tine support 124 is of polygonal, and preferably nearly square or at least rectangular, cross-section (see FIG. 23). In order to fasten the tines 134 in place, each tine support 124 is provided at regular intervals along its length with holders 137 that receive fastening portions 138 of the tines 134. Each tine 134 also has an active or soil working portion 139 that is of gently curved configuration and that tapers progressively towards its free end or tip. At the end of each fastening portion 138 remote from the corresponding active or soil working portion 139, said portion 138 is formed with a screwthread to receive a retaining nut 140 which, when in its operative position, secures the tine 134 in its holder 137. A shoulder 141 is formed between each active or soil working portion 139 and the corresponding fastening portion 138 and said shoulder bears firmly against a matchingly shaped surface at the end of the corresponding holder 137 when the corresponding nut 140 is tightened. The shoulder 141 and co-operating surface of the holder 137 exhibit a number, such as four, of relatively inclined flats in order to prevent the tine 134 turning about the longitudinal axis of its fastening portion 138 in the holder 137 when the nut 140 has been tightened. It can be seen from the drawings, and particularly from FIGS. 17 and 23 thereof, that the row of nuts 140 corresponding to each tine support 124 is covered by a common hood or screening plate 142, said hoods or screening plates 142 being retained in their operative positions by the heads of a plurality of small screws 143 whose shanks are entered into correspondingly threaded blind axial bores at the neighbouring ends of the fastening portions 138 of the tines 134.

The gentle curvature of the active or soil working portions 139 of the tines 134 is such as to direct the free ends of tips of those tapering tines generally forwardly with respect to the intended directions of rotation B of the working members 135 around the axes f. As can be seen best in FIG. 24 of the drawings, the active or soil working portion 139 of each tine 134 is of polygonal and preferably square or at least rectangular corss-section. In this embodiment, the single rotor 136 is provided at diametrically opposite sides of its own axis of rotation e with two working members 135 that als0 rotate around corresponding axes f during their own bodily displacement around the axis e due to provision of the control mechanism that is afforded by the toothed pinion and sprocket wheel and chain transmission that, in this embodiment, if furnished only at one lateral side or end of the rotor 136. In this embodiment, each working member 135 has an active part that is afforded by only a single row of tines 134. The cover plate or casing 132 carries a ring 144 whose end that is remote from said cover plate or casing is provided with a sprocket wheel 145. The sprocket wheel 145 is in driven communication with a smaller sprocket wheel 147 by was of a transmission chain 146, the wheels 145 and 147 and the chain 146 being contained within a protective casing 147A. The sprocket wheel 147 is mounted on a shaft 148 that is parallel to the shaft 121 and whose end that is remote from said sprocket wheel 147 is rotatably journalled in a gear box 149 fastened to the frame beam 4. The shaft 148 is provided, inside the gear box 149, with a bevel pinion 150 whose teeth are in drive mesh with those of a further bevel pinion 151 carried by a shaft 152 that is perpendicular to the shaft 148 and which has a leading splined or otherwise keyed end which projects forwardly from the gear box 149 with respect to the intended direction of operative travel A of the rotary plough or cultivator to serve as a rotary input shaft of that plough or cultivator. The end of the shaft 152 which has just been mentioned can be placed in driven connection with the power take-off shaft of an agricultural tractor or other oeperating vehicle by way of an intermediate telescopic transmission shaft 153 which is of a construction that is known per se having universal joints at its opposite ends. As in the embodiment of FIGS. 1 to 9 of the drawings, upwardly and downwardly adjustable soil-cutting coulters 56 are arranged in holders located close to the opposite ends of the frame beam 2.

Figure 19:
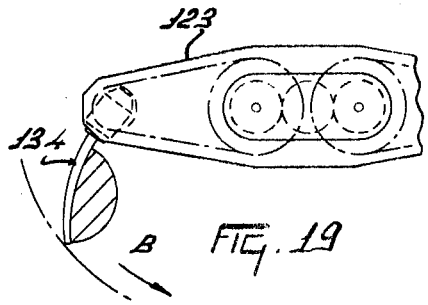
Figure 20:
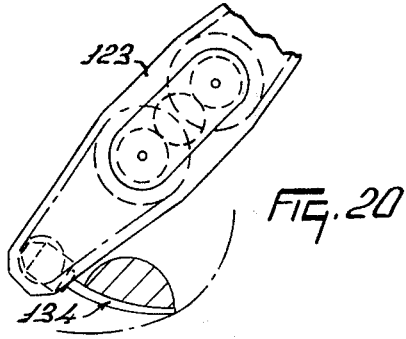
Figure 21:
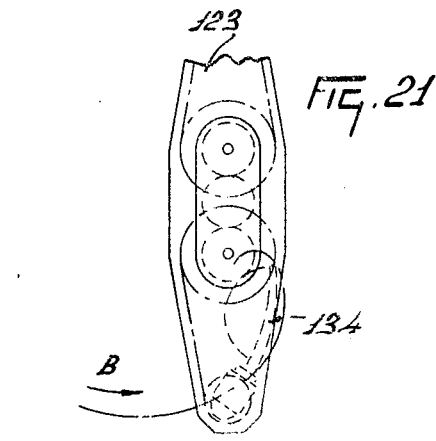
Figure 22:
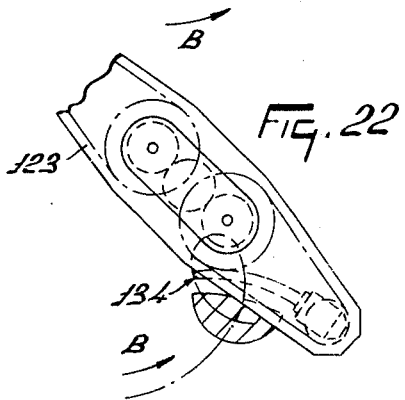

In this embodiment, the transmission ratio between the sprocket wheels 128 and 126 is 2 : 1 so that, during one complete revolution of the whole of the rotor 136 around the axis e, each working member 135 will have rotated twice around the corresponding axis f. In the use of the rotary plough or cultivator, its coupling member or trestle 54 is connected to the three-point lifting device or hitch of the operating agricultural tractor or other vehicle in a manner which is generally known per se and which can be seen in outline in FIGs. 17 and 18 of the drawings and the leading splined or otherwise keyed end of the shaft 152 is placed in driven connection with the power take-off shaft of the same agricultural tractor or other vehicle by way of the intermediate telescopic transmission shaft 153. The coulters 56 are set at appropriate height levels relative to the frame 1 for the particular operation that is to be performed and, upon moving over land that is to be ploughed or cultivated, the rotor 136 revolves around the axis e in the direction B shown in FIG. 18 of the drawings whilst the working members 135 both rotate about their corresponding axes f in the same anticlockwise directions B as seen in FIG. 18, FIG. 19 of the drawings illustrates the condition when the active or soil working portions 139 of one row of tines 134 have just penetrated into the soil and loosened a fresh slice thereof between the slits cut by the coulters 56. As the tines 134 of the same working members 135 move onwardly through the soil in the direction B, which is generally rearward with reference to the direction of travel A, they reach the condition shown in FIG. 20 and subsequently the condition shown in FIG. 21 of the drawings. The gently curved active or soil working portions 139 of the tines 134 first support the loosened slice of soil from beneath as the tines move rearwardly through the surrounding soil but said slice falls back into substantially the position from which it was originally cut, except that it is in a substantially inverted condition, as the tines move upwardly out of the soil in substantially the position that is illustrated in FIG. 22 of the drawings. This is because each row of tines 134 executes one complete revolution around the corresponding axis f during only half of a complete revolution of the whole rotor 136 around the axis e. As the row of tines 134 which has just been mentioned leaves the soil, the row of tines 134 of the other working member 135 penetrates the soil to cut a new slice thereof in substantially the position illustrated in FIG. 19. The path that is traced by the tips of the tines 134 during one half revolution of the rotor 136 can be seen in broken lines in FIGs. 18 to 22 of the drawings and it will be realised that a similar movement takes place during the other half of a complete revolution of the rotor to bring said tines 134 back to the dispositions shown in FIGS. 18 and 19 of the drawings at the end of the complete revolution.

The construction of the active or soil working portions 139 of the tines 134 that has been described and that is illustrated in the drawings is sich that they will penetrate effectively into soils of all kinds that are likely to be met with during agricultural operations and will deal without difficulty with hard soils and even with heavy and very moist soils. Even with such adverse soils, the successively displaced slices of soil can be inverted and delivered effectively without diffficulty. Nevertheless, tines which differ in shape and/or construction to the tines 134 that have been described and that are illustrated in the accompanying drawings can be substituted if preferred. All of the tines that have been described and that are illustrated in the accompanying drawings work the soil effectively without tending to cause sealing of the subsoil.

Although various features of the rotary ploughs or cultivators that have been described will be set forth in the following claims as inventive features, it is emphasised that the invention is not necessarily limited to those features and that is embraces within its scope every part of each rotary plough or cultivator that has been described and/or that has been illustrated in the acccompanying drawings both individually and in various combinations.

What we claim is:

1. A rotary plough comprising frame means and at least one elongated rotor mounted on said frame means, said rotor being rotatable about a first substantially horizontal axis of rotation defined by a shaft connected to said frame means, said rotor having at lease one soil-working member comprising a rotatable tine support with a row of tines having active soil working portions, said support being spaced from said shaft and rotatable about a corresponding, substantially horizontal axis that is spaced from said first axis, driving means connected to revolve said rotor and said driving means including a control mechanism that drivingly interconnects said shaft with said support, said control mechanism comprising gear means that establishes a transmission gear ratio and rotates said tines about said corresponding axis responsive to the revolutions of said rotor about said first axis, the soil engaging position of the soil working member and said tines being rotatable and movable in a forward direction with respect to the normal direction of movement of said rotor, said tines being progressively movable and rotatable about both of the axes to cut, raise and drop lumps of earth in inverted positions.

2. A rotary plough as claimed in claim 1, wherein said control mechanism comprises a chain transmission that extends between a gear mounted on said shaft and a further gear on the support of said soil working member.

3. A rotary plough as claimed in claim 2, wherein said gear and further gear have the same size and equal numbers of teeth.

4. A rotary plough as claimed in claim 12, wherein an adjusting device is connected to said shaft and that shaft is turnable relative to said central support by said device, the soil engaging positions of said tines being adjustable by said device through said control mechanism during the non-rotation of said rotor.

5. A rotary plough as claimed in claim 4, wherein said adjusting device includes a setting lever secured to one end of said shaft and means for retaining said lever in any one of a plurality of settings.

6. A rotary plough as claimed in claim 5, wherein said lever is connected to a first sleeve which surrounds said shaft and said sleeve is turnable together with said shaft, said shaft having a further sleeve which is associated with said first sleeve through a stepped coupling and said gear being fixed to said further sleeve.

7. A rotary plough as claimed in claim 1, wherein there are two soil-working members rotatably mounted on said rotor and a corresponding transmission of the control mechanism on said rotor that drives each of the two soil-working members around their corresponding axes of rotation.

8. A rotary plough as claimed in claim 1, wherein said control mechanism has a chain transmission that interconnects the shaft of said rotor to said tine support via a transmission ration of 2:1 the soil-working portions being turnable half a revolution about the corresponding axis of said support during a complete revolution of said rotor.

9. A rotary plough as claimed in claim 1, wherein each rotor has elongated guide means for guiding successive slices of earth that are displaced by the active portions of said working members.

10. A rotary plough as claimed in claim 9, wherein said guide means is located at least partly around and above the axis of rotation of each rotor.

11. A rotary plough as claimed in claim 10, wherein said guide means is formed by at least one portion of a jacket that surrounds the axis of rotation of ech rotor.

12. A rotary plough as claimed in claim 11, wherein said jacket portion is positioned to serve as a scraping or shedding surface which cooperates with at least one active portion of at least one working member during its rotation.

13. A rotary plough as claimed in claim 12, wherein said jacket portion has a cylindrically curved shape with a center of curvature that substantially coincides with the corresponding axis of rotation of the cooperating working member.

14. A rotary plough as claimed in claim 1, wherein said tines are made in integral pair and each pair comprises a tine in each row, each tine having a shallow S-shaped configuration as seen in side elevation.

15. A rotary plough as claimed in claim 14, wherein each pair of tines has a common central fastening portion.

16. A rotary plough as claimed in claim 15, wherein said fastening portion is polygonal in cross-section.

17. A rotary plough as claimed in claim 14, wherein said fastening portion is located between two separate portions of said tine support.

18. A rotary plough as claimed in claim 17, wherein one portion of said tine support is movable relative to another portion and clamping is provided on said tine support to clamp said portions together and fasten the tines in place between said portions.

19. A rotary plough as claimed in claim 18, wherein the fastening portions of each tine is clamped between depressions in said portions of the tine supports.

20. A rotary plough as claimed in claim 19, wherein bolts secure said portions in clamped together relationship and said bolts are located in said depressions.

21. A rotary plough as claimed in claim 1, wherein said support is mounted on an elongated plate member that is secured to a central support of said rotor and said plate member houses said control mechanism, said central support being directly connected to said driving means and surrounding said shaft.

22. A rotary plough as claimed in claim 21, wherein the opposite ends of said support are connected to two elongated plate members and said plate members are mounted on said central support.

23. A rotary plough as claimed in claim 1, wherein there are two soil-working members rotatably mounted on said rotor and said working members are positioned substantially diametrically opposite to one another with respect to said axis of rotation of the rotor.

24. A rotary plough as claimed in claim 23, wherein the corresponding axes of rotation of said working members are located at equal distances from the axis of rotation of said rotor, said corresponding axes and said axis of rotation of the rotor being coplanar.

25. A rotary plough as claimed in claim 1, wherein there are two rotors rotatably mounted on said plough and each rotor has two soil-working members, a corresponding control mechanism being connected at each side of each rotor to rotatably drive at least one of said soil-working members.

26. A rotary plough as claimed in claim 1, wherein said soil-working member comprises at least one row of tines mounted on an elongated tine support, the tines of said row being spaced apart from one another at regular intervals and extending substantially parallel to one another.

27. A rotary plough as claimed in claim 26, wherein the longitudinal center line of each tine is contained in a plane that is substantially perpendicular to the corresonding of axis of rotation of its corresponding soil-working member.

28. A rotary plough as claimed in claim 27, wherein each tine has a screwthreaded fastening portion and the screwthread cooperates with a nut to fix said fastening portion in a holder on said elongated support.

29. A rotary plough as claimed in claim 27, wherein each tine tapers from a fastening portion on said working member towards a free end.

30. A rotary plough as claimed in claim 29, wherein each tine is curved with its free end extending forwardly with respect to the normal direction of rotation of said working member.

31. A rotary plough as claimed in claim 29, wherein each tine has an active soil-working portion of polygonal cross-section, at least some of the flat sides of said cross-section being formed with longitudinally extending grooves.

32. A rotary plough as claimed in claim 31, wherein said grooves extend substantially the entire length of said soil-working portion.

33. A rotary plough as claimed in claim 29, wherein each working member has two rows of tines and each row is mounted on its corresponding tine support, said two rows of tines being arranged substantially diametrically opposite to one another on a respective tine support with respect to the axis of rotation of the corresponding working member.

34. A rotary plough as claimed in claim 1, wherein there are two soil-working members rotatably mounted on said rotor about corresponding axes of rotation, each working member comprising two rows of tines that extend in substantially opposite directions relative to said corresponding axis of rotation, said control mechanism being interconnected to said members to rotate those members during each revoluation of said rotor.

35. A rotary plough as claimed in claim 1, wherein said shaft is normally stationary and said rotor has a central support which is driven by said driving means to revolve around said shaft, said central support indirectly supporting each soil-working member.

36. A method of ploughing soil with an implement comprising at least one rotor having at least one working member for soil, said method comprising the steps of revolving said rotor and working member and causing the working member progressively to loosen successive slices of soil from surrounding undisplaced soil rotating said working member independent of said rotor to turn each loosened slice of soil around its axis while displacement of said working member takes place during revolution of the rotor around its own axis of rotation and depositing each successive loosened slice of soil back in the furrow or cavity from which it was excavated in substantially its original position lenghtwise of that furrow or cavity but in a substantially invented condition.

37. A method as claimed in claim 36, wherein each successive slice of earth is moved beneath the axis of rotation of the rotor during turning thereof around its longitudinal axis.

38. A method as claimed in claim 37, wherein each successive slice of earth is moved over the axis of rotation of the rotor during turning thereof around its longitudinal axis.

39. A rotary plough comprising frame means having at least one elongated rotor mounted on said frame meanss and said rotor being rotatable about a first substantially horizontal axis of rotation defined by a shaft connected to said frame means, each rotor having two spaced apart soil-working members and each soil-working member being a rotatable tine support with at least one row of tines on that support, driving means connected to said rotor for revolving same, said driving means including a control mechanism that interconnects said shaft with said support and said control mechanism comprising gear means that establishes a transmission gear ratio to rotate each soil-working member support about its corresponding axis of rotation, said tines having soil-working portions that extend forwardly in the soil-engaging position of the soil-working member, said tines being rotatable in a forward direction with respect to the normal direction of movement of said rotor, said tines being movable and rotatable about said axis of rotation and the axis of rotation of its corresponding support to cut, raise and drop lumps of earth in inverted positions.

40. A rotary plough comprising frame means having at least one elongated rotor mounted on said frame means and said rotor being rotatable about a first substantially horizontal axis of rotation defined by a shaft, said rotor having two spaced apart soil-working members and each soil-working member being a rotatable tine support with two oppositely positioned rows of tines mounted on that support, driving means connected to said rotor for revolving same, said driving means including a control mechanism that interconnects said shaft with each tine support, said control mechanism comprising gear means that establishes a transmission gear ratio to rotate each soil-working member with respect to the remainder of said rotor, said tines having soil-working portions that extend forwardly in the soil-engaging position of the soil-working member, said tines being rotatable in a forward direction with respect to the normal direction of movement of said rotor, said tines being movable and rotatable about said axis of rotation and the axis of rotation of its corresponding support to cut, raise and drop lumps of earth in inverted positions.

* * * * *